No. 621,072. Patented Mar. 14, 1899.
W. B. GREGORY.
BICYCLE HOLDER AND FASTENER.
(Application filed Sept. 5, 1896.)
(No Model.) 2 Sheets—Sheet 1.
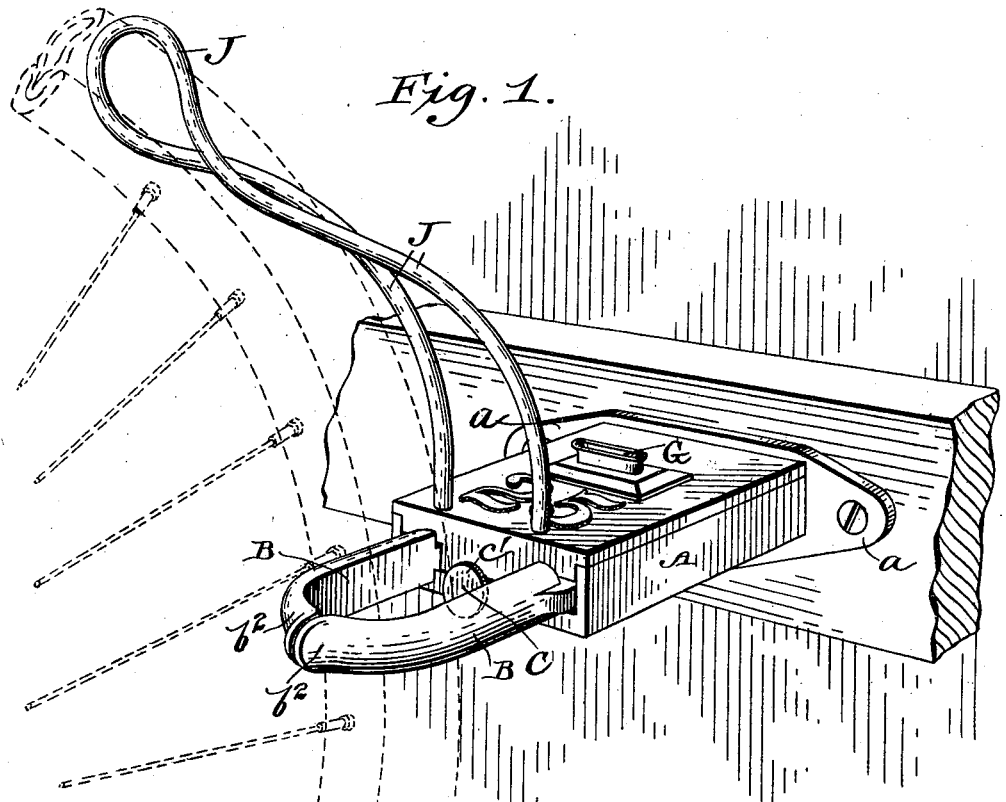
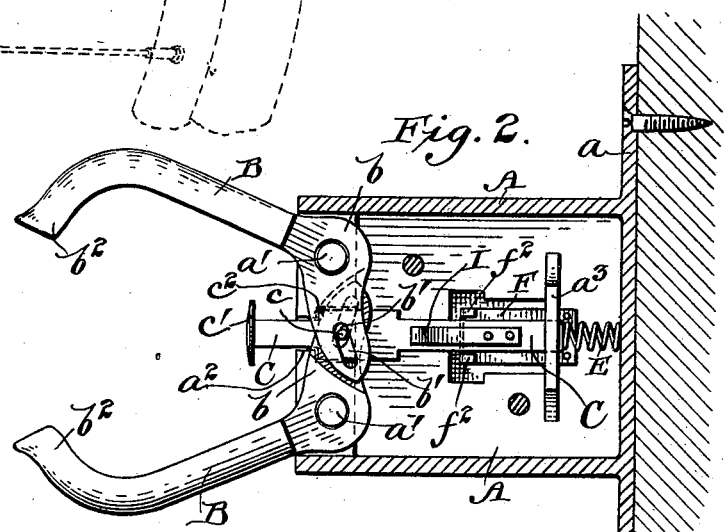
WITNESSES
INVENTOR
William B. Gregory No. 621,072. Patented Mar. 14, 1899.
W. B. GREGORY.
BICYCLE HOLDER AND FASTENER.
(Application filed Sept. 5, 1896.)

(No Model.) 2 Sheets—Sheet 2.

WITNESSES
INVENTOR

United States Patent Office.

WILLIAM B. GREGORY, OF WASHINGTON, DISTRICT OF COLUMBIA, ASSIGNOR OF ONE-FOURTH TO MRS. A. H. ARMSTRONG, OF LINCOLN, NEBRASKA.

BICYCLE HOLDER AND FASTENER.

SPECIFICATION forming part of Letters Patent No. 621,072, dated March 14, 1899.

Application filed September 5, 1896. Serial No. 605,007. (No model.)

*To all whom it may concern:*

Be it known that I, WILLIAM B. GREGORY, a citizen of the United States, residing at Washington, in the District of Columbia, have invented certain new and useful Improvements in Bicycle Holders and Fasteners; and I do hereby declare the following to be a full, clear, and exact description of the invention, such as will enable others skilled in the art to which it appertains to make and use the same.

My invention relates to bicycle holders and fasteners; and it consists in the combination, with a suitable casing, of pivoted arms for embracing the rim and tire of a bicycle, a sliding plunger adapted to be operated by the pressure of the wheel for fastening the said arms in their closed position, and means for releasing said plunger and arms.

It also consists in the combination, with a suitable casing, of oscillating arms for holding a wheel in an upright position, a sliding plunger adapted to be reciprocated for opening or closing said arms, means for fastening said plunger to hold the said arms in their closed position, and a combined check and key for releasing said fastening means.

It also consists of certain other novel constructions, combinations, and arrangements of parts, as will be hereinafter particularly described and claimed.

Figure 3:
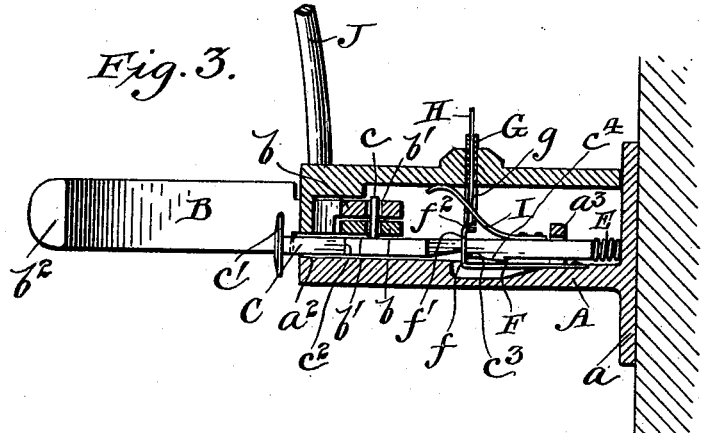
Figure 4:
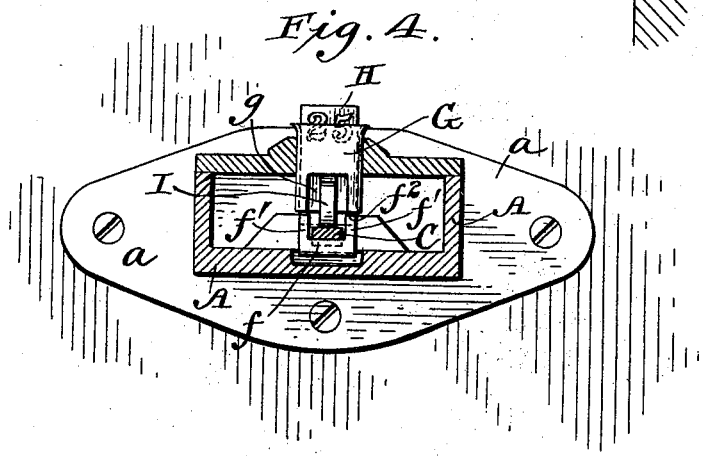
Figure 5:
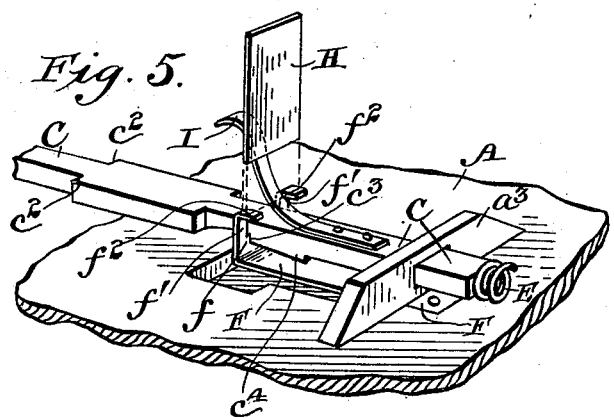

In the accompanying drawings, Figure 1 represents a perspective view of my improved bicycle holder and fastener. Fig. 2 represents a horizontal section of the same. Fig. 3 represents a central vertical longitudinal section of my device. Fig. 4 represents a vertical transverse section through the same, and Fig. 5 represents a perspective view of the means for controlling the movement of the plunger.

A in the drawings represents a suitable casing, B B pivoted arms, and C a plunger.

The casing A, preferably constructed of some metal in order to possess the necessary strength, is provided with a broad flange $a$, whereby it may be secured by screws or any suitable means to a wall, fence, or framework of any kind where it is desired to provide a place for wheelmen to place their bicycles.

In order to provide a means for holding a bicycle in an upright position, I provide the casing A with forwardly-extending arms B B, the rear ends $b$ $b$ of which are flattened and extend into the casing A, where they are pivotally mounted upon the studs $a'$ $a'$ of said casing. The said rear ends $b$ $b$ of the arms B B are also bent at an angle to the rest of the arms and are adapted to overlap each other by each being made thinner at that part. These ends $b$ $b$ are provided with slots $b'$ $b'$, which are adapted to be engaged by a pin $c$ upon the plunger C, so that when the plunger C is reciprocated the arms are oscillated upon the studs $a'$ $a'$. The forward ends $b^2$ $b^2$ of the arms B B are bent toward each other, so as to be enabled to embrace the tire and rim of a wheel placed between them. It will be seen from the above description that when the arms B B are open the plunger will be in an extended position, as in Fig. 2 of the drawings, and when a wheel of a bicycle is thrust between said arms and pushed against the plunger the arms will be forced toward each other and clasp the tire of the wheel between. The forward end of the plunger is provided with an enlarged approximately flat head $c'$ to present a good bearing-surface to the tire of the wheel.

For the purpose of preventing unauthorized parties from removing a bicycle so left it is desirable to provide a suitable fastening means for the holding device. In carrying out this purpose I provide a simple though effective means for retaining the plunger in its innermost position. The plunger C is guided in its movement by a guide-passage $a^2$ in the casing A at its forward end and by an aperture in a cleat or projection $a^3$ at its rear end. The plunger C is provided with shoulders $c^2$ $c^2$ near its forward end, adapted to engage the casing A to limit its forward movement. A suitable spring E is interposed between the rear wall of the casing and the end of the plunger C, which normally tends to force the plunger forward and separate the arms B B. The under side of the plunger C is provided with a shoulder $c^3$, which forms part of the fastening mechanism. When the plunger C is forced to its rearward position, a spring F, mounted in the casing A below said plunger, is adapted by its upturned end portion $f$ to spring into engagement with the shoulder $c^3$ and retain it in said position against the action of the spring E. The casing A is preferably cut away beneath the forward end of the spring F to allow for the free movement of the same. The forward upturned end $f$ of the spring F is provided with extended portions $f'f'$, projecting above the plunger C on each side of the same and having horizontally-bent portions $f^2 f^2$. Immediately above the horizontal portions $f^2 f^2$ is arranged a guide G in the upper part of the casing A, the lower end of which comes into close proximity to said parts $f^2 f^2$ for the purpose of guiding a suitable check-key H, which may be inserted in said guide from the exterior to force down the spring F and thereby release the plunger C and arms B B. When it is desired to unfasten the wheel, the check-key is inserted into the guide G, the upper end of which may be made flaring to facilitate said insertion and pressed down upon the horizontal portions $f^2 f^2$ of the spring F, thus disengaging the spring from the shoulder $c^3$ of the plunger. This leaves the plunger free to be pushed forwardly by the spring E. The check-key H is preferably a flat piece of metal and is made of such length that when it is pushed into the guide G to unfasten the device it will come flush with the upper edge of said guide, so that it cannot be taken out again. To insure the check-key descending low enough in the guide G, the plunger C is thickened on an incline, as at $c^4$, which thickened portion when the plunger is in its extended position forces the spring F downward, so that the check-key may drop down a little farther in the guide. In order to push the check-key H out again when a bicycle-wheel is put into the holder, the plunger C carries upon its upper surface a flat spring I, so formed as to lift the check-key H when the plunger is pushed inward. The lower end of the guide G is provided with a cut-away portion, as at $g$, to accommodate the action of said spring.

If desired, an auxiliary holding device, as J, may be secured to the casing A, consisting of a piece of bent wire of suitable shape to receive the upper part of the wheel and further steady the same. This is not, however, necessary, as the device can be used without this auxiliary holder.

My device will be found very useful for places where it is desired to provide a suitable and safe holding and fastening device for wheelmen to leave their wheels—as, for instance, at the entrances of hotels, places of amusement, restaurants, and all kinds of places of business. In this connection the great advantage of my combined check and key will be readily seen, for it is contemplated supplying such a place with a number of the holding and fastening devices, in which case it will be desirable to number the casings and the check-keys correspondingly, so that when a wheel is placed in one of the holders and fastened the person may take out and retain the check-key, which is pushed up in the check-guide G by the spring I. When the wheelman returns to get his wheel, he can readily find it among a great number of others by looking for the holder having the number corresponding to the number on his check-key. In this connection it is contemplated varying the size and shape of the check-keys and the parts engaged by the same, so that each check will only be able to release its corresponding holder and fastener. It is obvious that such slight variations can be made without departing in the least from the spirit of my invention.

It will be observed that my device is of very simple and cheap construction and yet very effective. It will not get out of order easily and can be made strong and secure.

It will further be seen that the fastening means is adapted to be operated and the bicycle released simply by a straight sliding movement of the check-key and that the key can be removed by a like movement.

Having described my invention, what I claim, and desire to secure by Letters Patent, is—

1. In a bicyle holder and fastener, the combination with a suitable casing, of pivoted arms adapted, when closed, to hold a wheel, a sliding plunger mounted in said casing, one end thereof being adapted to project outside the casing and to receive the direct impact of the wheel for forcing it inwardly and thereby closing the said pivoted arms, means for operatively connecting said plunger with the arms, a spring for engaging a shoulder near the inner end of said plunger to fasten it in its inmost position and sliding means for disengaging said spring, substantially as described.

2. In a bicycle-holder the combination with a holder and fastening means, of a check-key to release the bicycle by being pushed into said holder and adapted to remain in the said holder and a spring mounted in the holder and adapted to be pushed beneath the check-key upon the insertion of another bicycle whereby the check-key will be thrown to a position to be readily withdrawn from the holder, substantially as described.

In testimony whereof I hereunto affix my signature in presence of two witnesses.

WILLIAM B. GREGORY.

Witnesses:
T. REED CLIFT,
CASSELL SEVERANCE.